Oct. 23, 1945.  C. J. HOLLAND  2,387,264

VEHICLE SPRING

Filed Nov. 3, 1941

INVENTOR.
Cyrus J. Holland
BY Marry, Brown + Co
ATTYS.

Patented Oct. 23, 1945

2,387,264

UNITED STATES PATENT OFFICE 2,387,264

VEHICLE SPRING

Cyrus J. Holland, Chicago, Ill., assignor to Holland Company, a corporation of Illinois Application November 3, 1941, Serial No. 417,661

8 Claims. (Cl. 267—61)

This invention relates to spring suspension, and more particularly to spring suspension for motor vehicles.

One of the objects of the invention is the provision of a new and improved coil spring having turns of uniform cross-section, and incorporating novel structure for causing the spring to vibrate at a uniform frequency under variable loads.

A further object of the invention is the provision of a new and improved spring suspension comprising coil springs, the turns of each of which have pitches so arranged that the natural frequency of the springs will remain substantially constant for variable loads within certain operating limits to which the spring is adapted to be subjected in normal use.

Another object of the invention is the provision of a spring suspension for vehicles that is simple in construction, effective in operation, that may be manufactured at low cost, and that is efficient in operation as a smooth riding spring.

Other and further objects and advantages of the invention will appear from the following description, taken in connection with the accompanying drawing, in which Fig. 1 is a front elevation of a portion of an automobile showing the invention in position thereon, with parts broken away and parts omitted for the sake of clearness;

Figure 1:
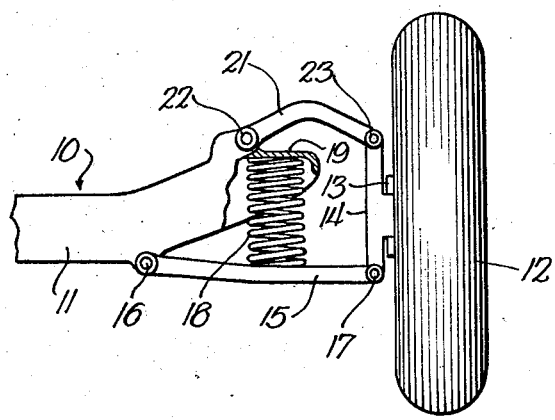

It is universally recognized that with the conventional body-supporting vehicle springs the spring suspension gives a softer ride, if the vehicle be loaded, than when partly or lightly loaded. It has also been determined that a spring suspension having a natural period of vibration above 80 or 90 per minute is decidedly uncomfortable for the passengers. If the vibrations of a spring suspension for motor vehicles do not exceed 60 per minute, the riding qualities of the suspension may be referred to as soft riding. The goal of motor vehicle builders is to provide vehicles that will have soft riding qualities for the vehicle at all speeds, and with light, intermediate or heavy loads over various kinds of roads.

In the conventional spring suspension light and heavy loads have different periods of vibration, the lighter the load the higher the number of vibrations per unit of time. In other words, with the conventional helical spring, for instance, the frequency of vibration decreases as the load increases, and consequently many vehicles ride very softly when loaded that are rough riding when lightly loaded.

The present invention seeks to overcome this difficulty by employing springs having the characteristics of soft riding under all load conditions. Furthermore, the springs are so constructed that their effective static deflection remains constant for all loads. In the present construction this is accomplished by varying the pitch of the turns of helical or coil springs. These springs are so constructed that they not only have a constant frequency for all loads, but that frequency is such as to afford soft riding qualities to the entire spring assembly.

The spring disclosed in this application differs from the conventional helical body-supporting spring for motor vehicles in that each spring is so designed as to have approximately the same frequency; i. e., a constant effective static deflection under the load of the empty vehicle, the intermediate load and the full load, as the present conventional body-supporting spring has under the full load only, so that the critical periods of oscillation for this spring at all loads is confined to a narrow range well within those vibrations that may be termed pleasant or soft riding.

Referring now to the drawing, the reference character 10 designates, generally, a motor vehicle having a front axle beam 11, a wheel 12, a steering knuckle 13, and a steering knuckle support 14 attached thereto for each front wheel. The axle beam 11 is supported at each end from the knuckle support 14 by means of lower suspension arms 15 and upper suspension arms 21. The arms 15 are pivotally connected to the axle beam, as at 16, and to the support 14, as at 17.

A coil spring, in the form of a helical, is interposed between the lower suspension arms 15 and an extension 19 on the axle beam 11. The extension 19 forms a seat for the upper end of the spring 18, as shown in Fig. 1 of the drawing. The upper suspension arms 21 are pivotally connected to the end of the axle beam 11, as at 22, and to the steering knuckle support 14, as at 23.

The arrangement of the arms 15 and 21 with reference to the steering knuckle 13 and axle beam 11 is diagrammatically shown in Fig. 1, and it is understood that other forms of suspension may be employed. The coil spring 18 embodying the invention is made from stock having uniform cross-sectional area throughout its length, except for the last turns at the ends which are flattened off to provide a flat face for the spring. While in the form of construction shown the inside and outside diameters of the coil remain constant throughout the length of the spring, it is understood that these diameters may be otherwise.

While the spring or spring stock is of substantially constant cross-sectional area throughout its length, certain of the turns vary in pitch from the remainder, so that the spring as a unit will have a constant effective static deflection for variable loads. In other words, the pitch of certain of these turns is so varied that the vibration of the spring or its frequency will remain constant, irrespective of the load applied thereto within a predetermined range.

Figure 4:
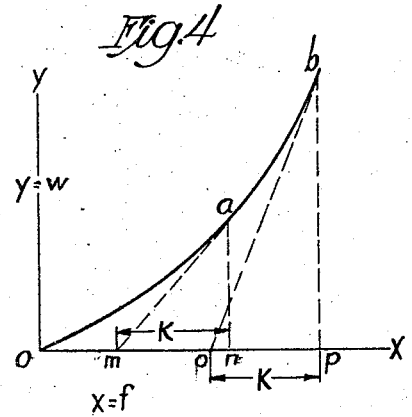
Fig. 4 is a graph illustrating a load deflection curve for the spring.

The expression "constant effective static deflection" is a constant for any particular spring embodying the invention, and may be represented on a load deflection curve diagram, as shown in Fig. 4, with the load as ordinate and deflection as abscissa. In this diagram it is represented by the length between the intercepts on the $x$-axis of the tangent to the curve at any point and the perpendicular dropped from said point to the $x$-axis, viz., the subtangent. In Fig. 4 the load deflection curve is represented by the line $o\ a\ b$. The load is indicated along the line $o\ y$, and the deflection along the line $o\ x$. Take any point, as $a$, on the curve, then drop a perpendicular from that point intercepting the line $o\ x$ at $n$, and a tangent to the curve at $a$ intercepting the line $o\ x$ at $m$, then the distance $m\ n$ is a constant which may be designated $k$. It will be found that if from any other point, as $b$, the normal to $o\ x$ be drawn and the tangent to the curve at that point be drawn, they will intercept the line $o\ x$ at $p$ and $o$, respectively, and the distance $o\ p$ or subtangent for the point $b$ on the curve will equal $m\ n$ or $k$. The distance $k$, then, represents the effective static deflection of the spring.

By definition, then, the tangent of any angle between such subtangent and tangent at any point is $$\frac{y}{k}$$

which is, therefore, the first derivative of the variable function, and $$\frac{dy}{dx}=\frac{y}{k}$$

from which $$\frac{dx}{dy}=\frac{k}{y}$$

$$dx=\frac{k\,dy}{y}=k\cdot\frac{dy}{y}$$

$$x=\int k\cdot\frac{dy}{y}=k\int\frac{dy}{y}$$

Since $$\int\frac{dy}{y}=\log_e y$$

$$x=k\log_e y+c$$

in which log $e$=logarithms according to the Naperian or hyperbolic system in which the base is 2.718281828.

The curve thus produced applies only when the load under consideration produces a deflection equal to or greater than $k$. This means that up to a certain point on the curve from the origin it is not possible to achieve constant effective static deflection—this point being defined as the point where the normal to the $x$-axis at this point intercepts the $x$-axis at a distance $k$ from the origin.

In my United States Letters Patent No. 2,267,153, of December 23, 1941, is found an example of the application of this formula to springs suitable for use in railway cars, and reference is made thereto for further discussion of this phase of the invention.

Figure 2:
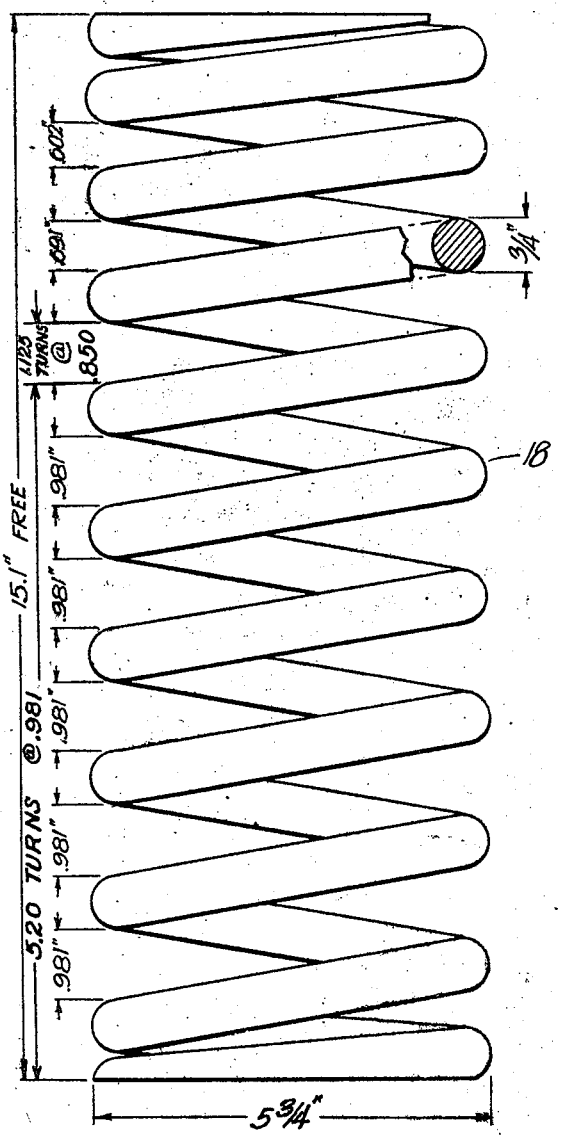
Fig. 2 is a side elevation of the spring with parts in section and parts broken away, and showing the spring on an enlarged scale from that disclosed in Fig. 1.
Figure 3:
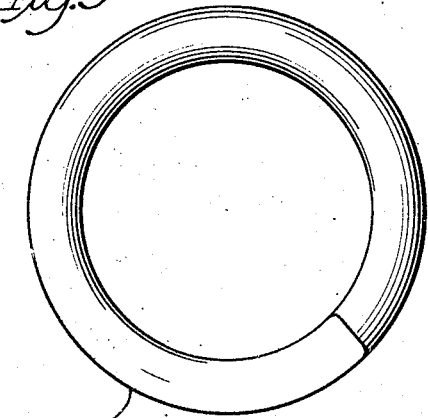
Fig. 3 is a plan view of the construction shown in Fig. 2.

In Fig. 2 are given some measurements that will illustrate one embodiment of the present invention. In this form of construction the turns are circular in cross-section, and the diameter of the stock of each turn is ¾". The distance between adjacent surfaces of the first two complete turns from the top is .602"; between the second and third is .691"; for the next 1⅛ turns the distance is .850"; and between the remainder of the adjacent turns the distance is .981".

In the use of these springs on a vehicle all of the springs may be substantially alike, so that the harmonic action will be the same for all springs and will remain constant. Or, if preferred, the springs in front may have a different periodicity from those at the rear. In order to prevent "pitching" or "galloping" it is considered good practice, in the building of passenger cars, to avoid having the periodicity of the vibration of the springs at the front of the car, the same as, or a multiple of, that of the rear springs.

In the operation of the device the coils or turns of low pitch being much weaker than the turns of higher pitch will, with light loads, furnish the principal portion of the satisfactory riding qualities of the suspension, while with heavier loads the weaker turns of the spring will close, or partially close, so that the turns of the next lower pitch will in turn furnish the principal portion of the satisfactory riding qualities of the suspension. Likewise, with very heavy loads the turns of low pitch may all close so that the satisfactory riding is furnished by the turns of higher pitch, while at the same time the frequency of vibrations of the spring assemblies remains substantially constant for all loads. In any event, the transition from the turns of lower pitch for supporting the load, to those of higher pitch, is imperceptible, that is, there is no sudden stop or change from one to another. In other words, there is no marked difference in the riding qualities of the suspension when operating under any or different load conditions.

The following is a copy of a record made with small model helical springs for a railway car, having variable pitch and so constructed as to embody my invention. The machine used in the experiment was so constructed and so operated as to simulate a railway train running at different speeds along a railroad having rail lengths of 33 feet. Each rail joint was assumed to give an impulse to the spring vibration as the truck passed over the joint. This was simulated by rotating a fly wheel beneath a pair of wheels supporting a platform on which the springs were mounted. The pair of wheels engaged the periphery of the fly wheel and the tread of the fly wheel had two slight depressions at opposite sides of the wheel, which would cause the pair of wheels to rise and fall as the fly wheel rotated, and this rising and falling of the platform would cause the springs which carried the loads to vibrate. The different weights were applied to the springs. These weights were as indicated, but each pound represents four thousand pounds in actual use on a railway car.

A speedometer operated in timed relation to the eccentric wheel indicated the miles per hour that the train was assumed to be traveling.

In the first column are the weights with which the spring was loaded. The second column indicates the deflection of the spring in inches, or fractions thereof; and the third column gives the rate of speed of the train per hour at which the critical vibration of the springs occurs.

*Critical Speeds M. P. H.*

| Weight | Deflection | Resonance |
|---|---|---|
| Pounds | Inches | |
| 2 | 32/64 | 40 |
| 3 | 53/64 | 35 |
| 4 | 71/64 | 35 |
| 5 | 88/64 | 35 |
| 6 | 100/64 | 35 |
| 7 | 109/64 | 35 |
| 8 | 117/64 | 35 |
| 9 | 124/64 | 35 |
| 10 | 131/64 | 35 |
| 11 | 137/64 | 35 |
| 12 | 143/64 | 35 |

It will thus be seen from this record that the critical vibration of the spring remains substantially constant for all loads, and is attained when the speed of the truck on which it is used reaches about 35 miles per hour. This means that the frequency of the spring remains substantially constant for all loads.

Due to tolerances and inaccuracies in spring manufacture there will be some slight variations in the critical vibrations of the springs in actual practice, but the results obtained will very closely approximate the theoretical result.

While springs with turns of only four different pitches are disclosed, it is understood that this arrangement may be carried out with more or less than this number of different pitches for the turns of the spring.

While the coil spring disclosed has turns that are circular in cross-section, it is understood that this is by way of example only, and that any spring having different cross-sectional dimensions and areas, or coil diameters and lengths, may have the pitch of the turns so made as to obtain a constant effective static deflection, or so arranged as to have a constant frequency under variable loads.

The dimensions given in Fig. 2 are for a conventional motor vehicle in which the natural frequency is such that the spring has pleasant riding qualities. If it is desired that the frequency of vibration of the spring assembly be different, or that the capacity of the spring be different, these dimensions must be changed accordingly. The structure disclosed is by way of example only, and is for any load between predetermined limits within the capacity of the spring, for accommodating, say, from one to six passengers.

The manner in which the formula $$x = k \log_e y + c$$

may be applied to the problem of designing a spring of the present character to meet various specifications will be readily apparent to one skilled in the art of spring design using conventional and well known spring formulas such as may be found in Kent's "Mechanical Engineering Handbook," or such spring engineering catalogues as "Mechanical Springs, Their Engineering and Design," published by the William D. Gibson Company of Chicago, Illinois.

For example, being given the required conditions, such as maximum over-all diameter, free height, load range, deflection characteristics, etc., the formula $x = k \log_e y + c$ is first used to determine whether it is possible to design a constant frequency spring meeting these conditions. If not, the computations will inform one what constant effective static deflection may be used to meet the load condition for the range of deflection specified. Then it will be necessary to make up a table from the minimum to maximum load showing the values of total deflection for selected equal increments of load using the same formula $$x = k \log_e y + c$$

to determine these values for each load increment. For this purpose it is convenient to convert the formula to the symbols ordinarily used in spring engineering formulas which would make the above formula read as follows:

$$f = k \log_e \frac{W}{1000} + c$$

in which $f$ = deflection under any load $k$ = the "constant effective static deflection" as defined $W$ = any load in pounds $c$ = a constant of integration, which varies with $W$ and with $f$ in terms of deflection from free length; that is, it is a constant which determines the location of the line on the graph with respect to the $y$ axis.

$\log_e$ = logarithms according to the Naperian or hyperbolic system in which the base is 2.718281828.

The load is expressed as $$\frac{W}{1000}$$

to simplify the use of logarithm tables.

Thereafter application of conventional spring formulae will enable one to determine the size of the bar stock to be used, and the number and pitch of each coil or portion thereof to produce a constant frequency spring having the required characteristics.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. In a vehicle spring suspension, a coil spring having uniform inside and outside diameters throughout its length and made from stock of uniform cross-section throughout its active length, the pitch of certain of said turns being greater than others and being such that the effective static deflection of the spring will be constant for variable loads with its load deflection curve conforming to the formula $x = k \log_e y + c$.

2. In a suspension for vehicles, a coil spring having its turns spaced apart and of uniform cross-sectional area and having the pitch of the complete turns at one end different from those at the opposite end, and the pitches of said turns being such that the spring will have a constant effective static deflection for variable loads with its load deflection curve conforming to the formula $x = k \log_e y + c$.

3. In a spring for vehicles, a supporting member, a supported member, a coil spring for supporting said supporting member from said supporting member, the turns of said spring being spaced apart and being of substantially uniform cross-section and the pitches of certain of said turns being different from others and being such that the spring will have a substantially constant effective static deflection for all loads with its load deflection curve conforming to the formula $x = k \log_e y + c$.

4. A coil spring having uniform inner and outer diameters throughout its length, the turns of said spring being of uniform cross-sectional area, the pitches of said turns being so varied that they will cooperate to provide a resilient unit having a constant effective static deflection under all load conditions with its load deflection curve conforming to the formula $x = k \log_e y + c$.

5. A spring made of stock of substantially uniform cross section and having certain of its turns coiled with varying pitch to close progressively under increasing load, the pitch variation conforming substantially with the load-deflection curve having the formula $x = k \log_e y + c$ in which $x$ = deflection,
$k$ = static deflection as defined,
$y$ = load,
$c$ = a constant.

6. A coil spring made of stock of substantially uniform cross section, a portion of said spring being wound at substantially constant pitch and the remainder of the spring varying in pitch to make the spring conform substantially with the load-deflection curve having the formula $$f = k \log_e \frac{W}{1000} + c$$

in which $f$ = deflection under any load,
$k$ = static deflection as defined,
$W$ = load in pounds,
$c$ = a constant.

7. In a suspension for a vehicle to carry various loads within a given range of loads at substantially constant frequency of vibration, a supporting member, a supported member, and a coil spring for supporting said supported member from said supporting member, said spring being made of stock of substantially uniform cross section and coiled with varying pitch to close progressively under increasing load over said range of loads, the pitch variation conforming substantially with the load-deflection curve having the formula $x = k \log_e y + c$ in which $x$ = deflection,
$k$ = static deflection as defined,
$y$ = load,
$c$ = a constant.

8. In a suspension for a vehicle to varry various loads within a given range of loads, a supporting member, a supported member, and a coil spring for supporting said supported member from said supporting member, a portion of said spring being wound at substantially constant pitch, the remainder of said spring being wound at varying pitch to close progressively under increasing load over said range of loads, the pitch variation conforming substantially with the load-deflection curve having the formula $$x = k \log_e y + c$$

in which $x$ = deflection,
$k$ = static deflection as defined,
$y$ = load,
$c$ = a constant.

CYRUS J. HOLLAND.